Feb. 4, 1936. J. A. HERBERT 2,029,924
SAFETY APPLIANCE FOR TRUCKS OF RAILWAY CARS
Filed Sept. 2, 1932 3 Sheets-Sheet 1
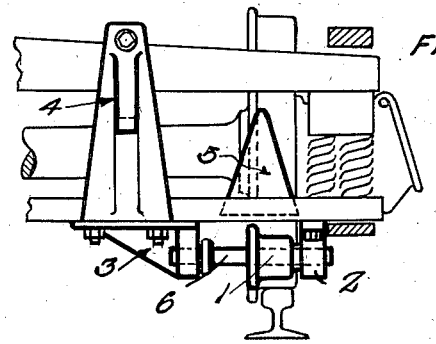
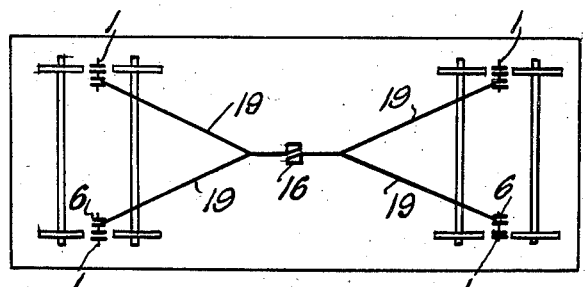
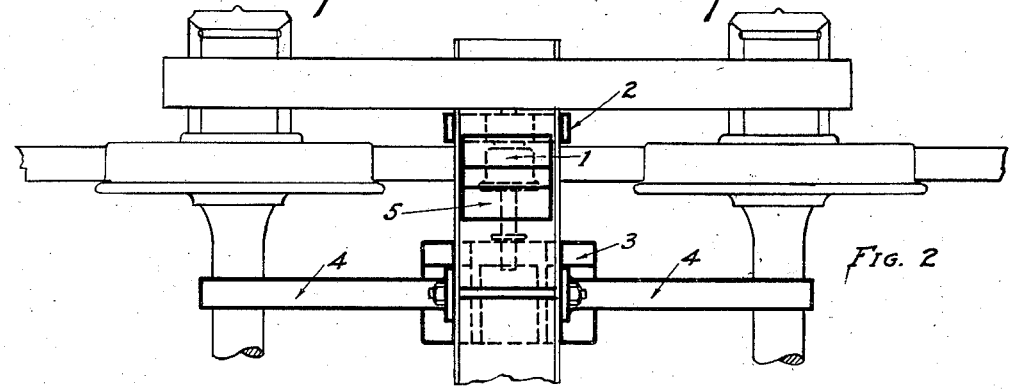
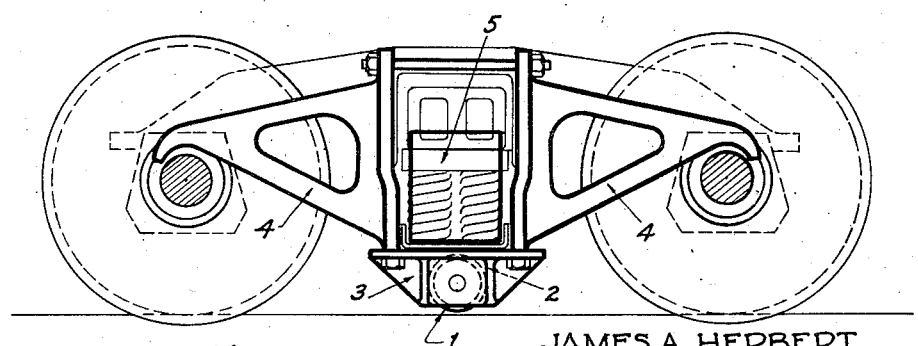
JAMES A. HERBERT
INVENTOR
ATTORNEY Feb. 4, 1936.   J. A. HERBERT   2,029,924
SAFETY APPLIANCE FOR TRUCKS OF RAILWAY CARS
Filed Sept. 2, 1932   3 Sheets-Sheet 2

JAMES A. HERBERT
INVENTOR

BY *Gilbert T. Morgan*

ATTORNEY

Feb. 4, 1936.　　　　J. A. HERBERT　　　　2,029,924

SAFETY APPLIANCE FOR TRUCKS OF RAILWAY CARS

Filed Sept. 2, 1932　　　3 Sheets-Sheet 3

JAMES A. HERBERT
INVENTOR

BY

ATTORNEY

Patented Feb. 4, 1936

2,029,924

UNITED STATES PATENT OFFICE 2,029,924

SAFETY APPLIANCE FOR TRUCKS OF RAILWAY CARS

James A. Herbert, Cleveland, Ohio; Elizabeth A. Herbert, executrix of said James A. Herbert, deceased, assignor of one-fourth to Gilbert Morgan, Cleveland, Ohio Application September 2, 1932, Serial No. 631,480

15 Claims. (Cl. 246—169)

My invention relates to a safety appliance for truck of railway car. Wheels used on railways are made solid on the axle and the axle extends outside of the wheel forming the journal which supports the trucks with bearing and lubrication provided in the journal boxes which are parts of the truck frame. From lack of lubrication the journal often melts; from defect in construction or otherwise the arch bar or side frame of the truck often breaks; and often from being heated by a brake shoe which does not release itself, or from defect in construction, a wheel breaks, in any of which cases the axle does not support its part of the load and the unsupported side of the truck sinks to the track and derails the car. My invention affords facilities for maintaining the truck and all its parts from dropping onto the track and derailing the train and at the same time setting the brakes on the train.

In the accompanying drawings:

Figure 1 is view from center of car showing inside hanger and wheel with wedge-shaped block on spring plate with arms over axle.

Figure 2 is top view of Figure 1.

Figure 3 is front view of Figure 1 showing slot in emergency wheel for wire.

Figure 4 is plan of car showing wires running from between each pair of wheels to break-down emergency valve on train pipe.

Figure 5:
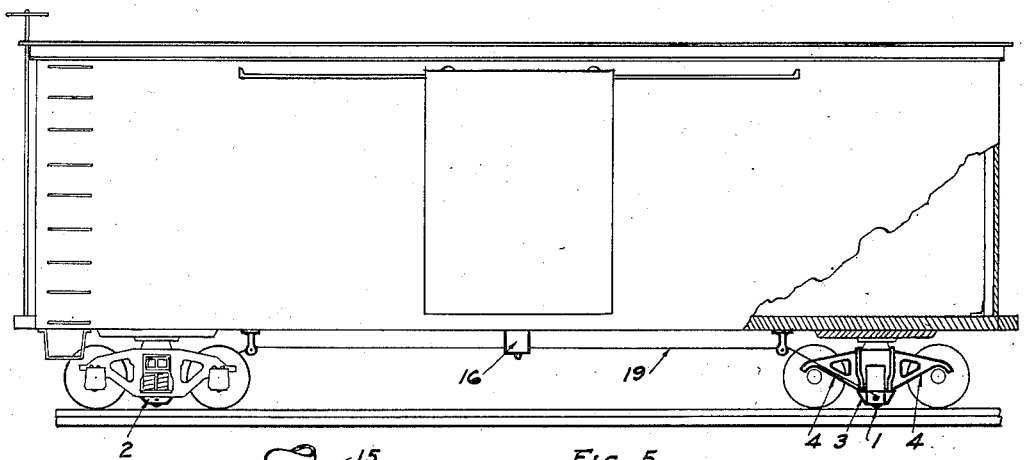
Figure 5 is side view of car with indication of inside view of wheel and appliance at one end and outside view at other, also indicating wires to break-down emergency valve on train pipe.
Figure 6:
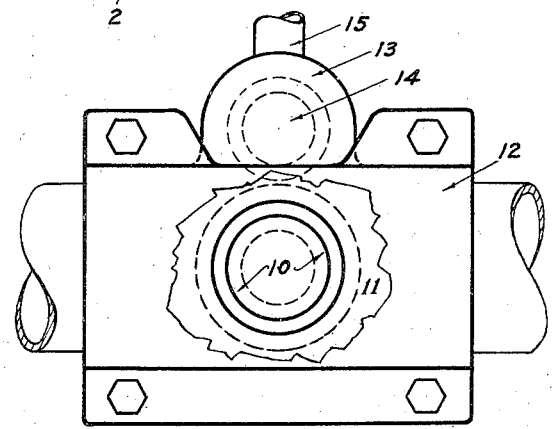
Figure 6 is top view of break-down emergency valve clamped onto train pipe showing in cut away top of valve and valve seat and valve operating on pipe from brake cylinder.
Figure 7:
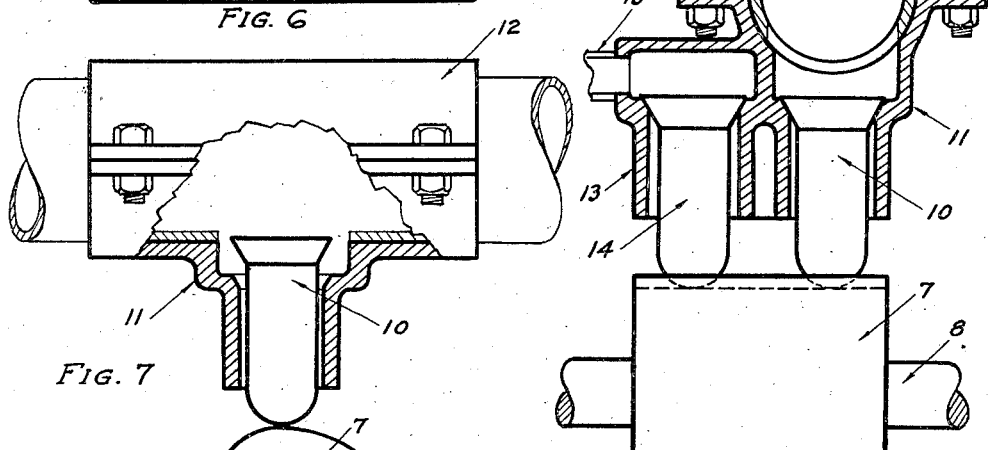
Figure 7 is side view of Figure 6 showing in cut away break-down emergency valve raised by cam to allow air to escape from train pipe.
Figure 8:
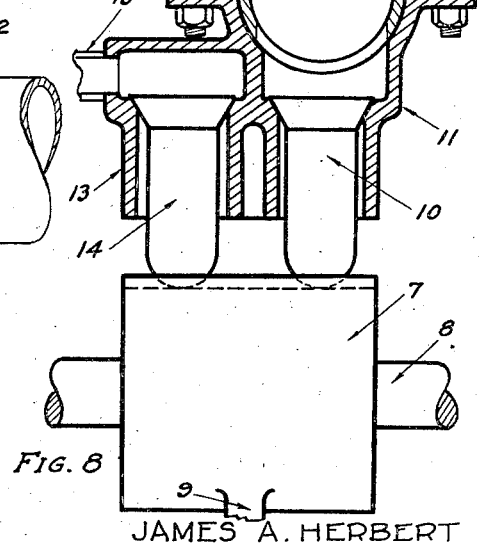
Figure 8 shows cross section of train pipe and clamps and seat of break-down emergency valve with valve in closed position indicating cam in neutral position and valve operating on brake cylinder also in closed position.
Figures 9, 10:
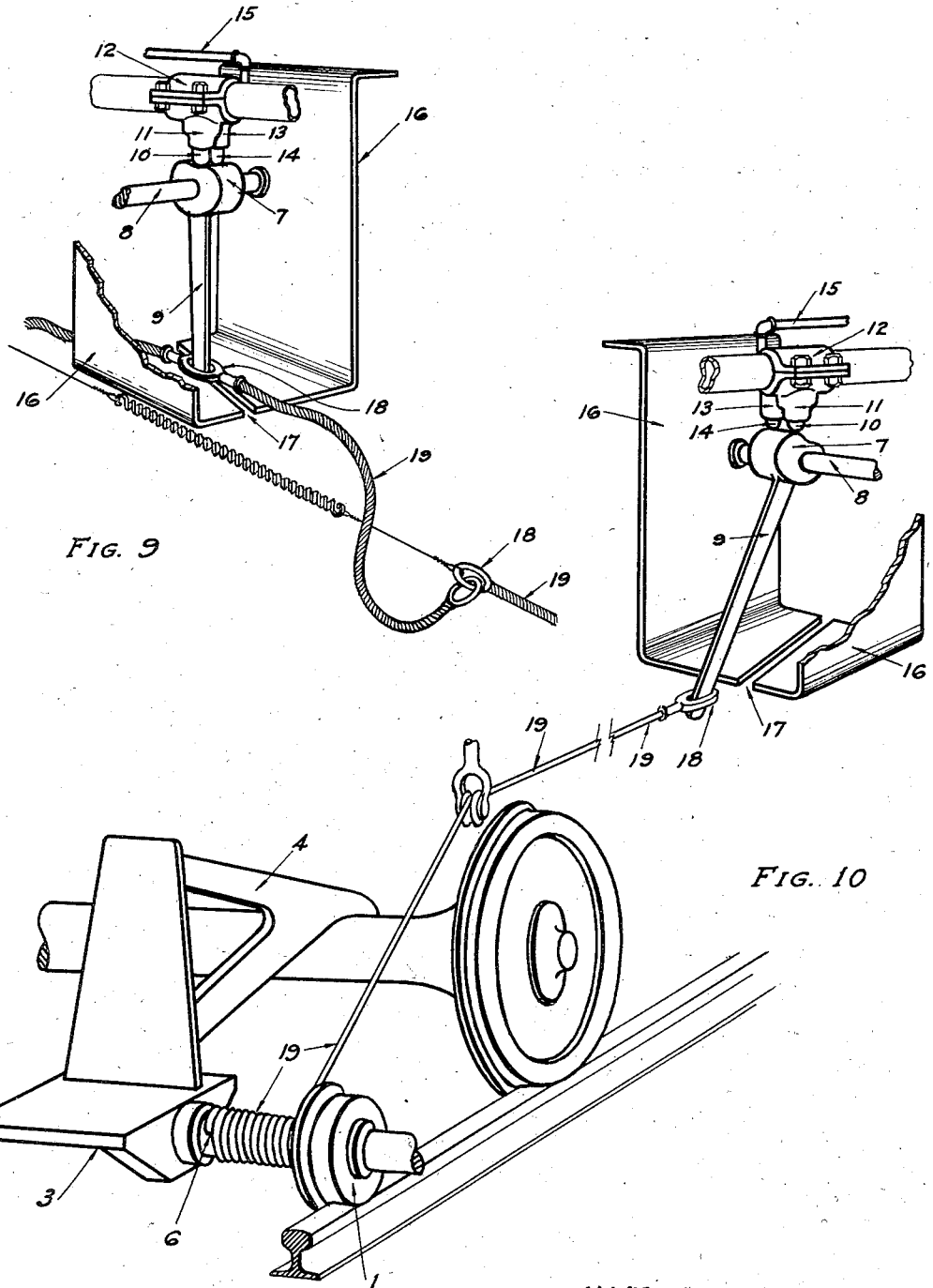

Figure 9 shows perspective view of break-down emergency valve and brake cylinder vent valve with cut away view of box around same showing slot on lower face, which slot is oblique to cam shaft. In this view valves are closed and cam lever is at neutral or perpendicular position. Wire is shown slack.

Figure 10 is a perspective view of the parts illustrated in Figure 9 and the portions of the truck immediately associated therewith for operating the same.

My invention is of a wheel (sometimes herein referred to as "emergency" wheel) supported between the wheels of a railway truck by brackets attached to the under side of the spring plate. This wheel is held in line over the rail but not touching it except in case of a break-down. In the axle of this wheel is a slot into which is fastened a wire or cord, the other end of which is attached to the end of an arm or lever. At the other end of the arm or lever is a double cam. In case of a break-down the failure of the truck to support the load allows the emergency wheel to come in contact with the rail and the rotary motion is commenced. This winds the wire and pulls the cam lever in a slot which is oblique to the cam shaft. As the lever passes the end of the slot it springs to a point at the center at which it would be but for the obliqueness of the slot. The cam at the other end of the lever presses a valve stem and releases an amount of air from the train pipe of the air brake system of the train and sets the air brakes in emergency position. As the air is so released from the train pipe the cam with the same movement opens a vent in the brake cylinder of the car and prevents building up the pressure in that cylinder thus avoiding the action of the air brake on the wheel where the break-down occurs. The train would then stop from the action of the brakes on the engine and the rest of the cars.

As the load on truck wheels on railway cars is outside the wheel, the tendency in case of failure of the journal, arch bar or side frame is for the weight on the opposite wheel to raise the axle and force the wheel against the bottom of the car body. The rotary motion causes the wheel to travel and changes the line of the axle so that the opposite wheel leaves the rail and derails the car. To prevent this an arm is provided in my invention to go over axle and hold it down until the train stops, a wedge-shaped block over brackets prevents the spring plate from giving away.

My invention is especially applicable to trucks of freight cars where derailment is exceedingly dangerous. If the arch bar or side frame breaks the wheel is released and the broken part falls down on the ties and derails the car. This causes all the cars to the rear to pile up and spread over the other tracks endangering other trains. In failure of lubrication the journal begins to melt. This appliance would go into use as soon as the journal melts a distance equal to the space between the wheel in this appliance and the rail.

The appliance is the combination of wheel of suitable material suspended by outside bracket 2 and inside bracket 3 from spring plate of truck of railway car with arm 4 over axle and block 5 between spring plate and bolster. In slot 6 of axle of wheel is fastened a wire 19 to cam lever 9 which pivots on shaft 8 on the other end of which lever 9 is double cam 7. Over train pipe is upper clamp 12 fastened to under clamp 11 in which is seat for valve 10 and attached to clamp 11 is valve box 13 in which is seat for valve 14 and into which valve box 13 is air line 15 from brake cylinder. Around valves is box 16 in the sides of which passes cam shaft 8 in the bottom of which box 16 is oblique slot 17 in which is held cam lever 9 to which is fastened wire 19 by link 18.

I claim:

1. In a safety device for railway cars having supporting wheels, brakes for said wheels, control means for said brakes, and means associated with said control means for operating the same upon the falling of any one of said cars, to apply the brakes on all the other cars and prevent the application of the brakes upon the fallen car.

2. In a safety device for railway cars having supporting wheels, brakes for said wheels, control means common to all the brakes, and actuating means connected with said control means and operated when a wheel of any car is not carrying a normal load, to apply the brakes on all the other cars and prevent the application of the brakes on the car with the incapacitated wheel.

3. In a train of railway cars having supporting wheels running on rails, an air brake system common to all the cars, and actuating means connected with said air brake system and operated upon the derailment of any car, to apply the brakes on all the other cars and prevent the application of the brakes on the derailed car.

4. In a train of railway cars having supporting wheels running on rails, a brake system common to all the cars, and actuating means carried by each car and connected with said brake system, said actuating means being operated upon contacting with a rail when one or more wheels of any car is incapacitated, to apply the brakes on all the other cars and prevent the application of the brakes on the car with the incapacitated wheel or wheels.

5. In a train of railway cars having supporting wheels, auxiliary supporting means for each car, said auxiliary supporting means being normally inactive, a brake system common to all the cars, and actuating means connecting each auxiliary supporting means with the brake system and operated when one of said auxiliary supporting means is rendered active, to apply the brakes on all the other cars and prevent the application of the brakes on the car with the active auxiliary supporting means.

6. In a train of connected railway cars each having a plurality of wheeled supporting trucks arranged to run on rails, an auxiliary supporting means associated with each truck and normally remaining inactive, an air brake system common to all the wheels of all the trucks, and actuating means connecting each auxiliary supporting means with said air brake system and operated when one of said auxiliary supporting means is rendered operative, to apply the brakes on all the other cars and prevent the application of the brakes on the car with the active auxiliary supporting means.

7. In a train of connected railway cars each having a plurality of wheeled supporting trucks arranged to run on rails, auxiliary supporting wheels associated with each truck and normally remaining inactive, an air brake system common to all the wheels of all the trucks, and actuating means connecting each auxiliary supporting wheel with said air brake system and operated when one of said auxiliary supporting wheels is rendered operative through an incapacitated wheel, to apply the brakes on all the other cars and prevent the application of the brakes on the car with the incapacitated wheel.

8. In a train of connected railway cars each having a plurality of wheeled supporting trucks arranged to run on rails, a pair of auxiliary supporting wheels associated with each truck and normally remaining inactive, brakes for all said wheels, an air brake system common to all said brakes, and an actuating connection between each auxiliary supporting wheel and said air brake system and operated when one of said auxiliary wheels is rendered active, to apply the brakes on all the cars and prevent the application of the brakes on the car with the active auxiliary wheel.

9. In a train of railway cars having supporting wheels, an air brake system common to all said brakes including a common brake pipe and a brake cylinder for each car, auxiliary supporting means associated with each car and normally remaining inactive, valve means carried by each car for venting the brake pipe and the individual brake cylinders, and valve operating means connecting each auxiliary supporting means with the valves associated with its respective car, to vent the brake pipe when one of said auxiliary supporting means is rendered operative thereby applying the brakes on all the other cars, and venting the brake cylinder associated with the car having the active auxiliary supporting means, to prevent the application of the brakes on said car.

10. The combination with a railway car having a pair of wheeled supporting trucks arranged to run on rails, of a pair of auxiliary supporting wheels carried by each truck and normally spaced from said rails, an air brake system common to all said wheels including the usual train line brake pipe and a brake cylinder, valves for venting the brake pipe and the brake cylinder, and operating connections between said auxiliary supporting wheels and said valves, to vent the brake pipe and the brake cylinder when one of said auxiliary supporting wheels is brought into contact with one of said rails.

11. The combination with a plurality of railway cars each having a plurality of wheeled trucks arranged to run on rails, of brakes for said wheels, an air brake system common to all said brakes including a common brake pipe and a brake cylinder for each car, a pair of auxiliary supporting wheels associated with each truck and normally remaining inactive, each car having a brake pipe vent valve and a brake cylinder vent valve, and operating connections between each of said auxiliary supporting wheels and said valves, to open the same when any one of said auxiliary supporting wheels is moved into contact with a rail, thereby preventing the application of the brakes upon the car with the active auxiliary supporting wheel and applying the brakes on all the other cars.

12. The combination with a plurality of railway cars connected together to make up a train, each of said cars having a plurality of wheeled trucks arranged to run on rails, a pair of auxiliary supporting wheels carried by each truck and normally spaced from said rails, brakes for said flanged wheels, an air brake system common to all said brakes including a common brake pipe and an individual brake cylinder for each car, a pair of valves carried by each car for venting the brake pipe and its respective brake cylinder, and operating connections between said auxiliary supporting wheels and said valves, to open the same when one of said auxiliary wheels is brought into contact with a rail, thereby preventing the application of the brakes upon the car with the active auxiliary supporting wheel and applying the brakes on all the other cars.

13. In a safety device for railway cars having supporting wheels, brakes for said wheels, a fluid presssure system for operating said brakes, and actuating means connected with said fluid pressure system and operated when any one of said supporting wheels is rendered inoperative, to apply the brakes on all the other cars and prevent the application of the brakes with the car with the inoperative wheel.

14. In a vehicle having wheeled supporting means, brakes for said wheels, a fluid pressure system common to all said brakes for operating the same, means carried by each car and connected with said fluid pressure system for operating the same when one of said supporting wheels is rendered inoperative, to apply the brakes on all the other cars, and means operating simultaneously with said first named means to prevent the application of the brakes on the car with the incapacitated wheel, both of said means being operated by contact with a supporting structure for said supporting wheels.

15. In a railway car having supporting wheels, brakes for said wheels, brake operating means including the usual train line brake pipe and a brake cylinder, valves for said brake line and said brake cylinder, an auxiliary supporting wheel, cam means associated with said valves for opening the same, a lever connected with said cam means, a cam surface cooperating with said lever to permit movement of the lever in one direction and prevent returning of the lever to its normal position after it has been moved a predetermined amount, said cam surface tending to flex the lever in its movement in one direction, and a connection between the lever and said auxiliary supporting wheel for operating the lever when the auxiliary supporting wheel is rendered operative.

JAMES A. HERBERT.